(12) United States Patent
Noguchi et al.

(10) Patent No.: US 11,072,700 B2
(45) Date of Patent: Jul. 27, 2021

(54) COMPOSITION COMPRISING FLUOROPOLYMER AND MOLDED ARTICLE

(71) Applicant: DAIKIN INDUSTRIES, LTD., Osaka (JP)

(72) Inventors: Tsuyoshi Noguchi, Osaka (JP); Fumihiro Kamiya, Osaka (JP); Yoshinari Taguchi, Niigata (JP); Masato Tanaka, Niigata (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 215 days.

(21) Appl. No.: 15/737,582

(22) PCT Filed: Jun. 17, 2016

(86) PCT No.: PCT/JP2016/068103
§ 371 (c)(1),
(2) Date: Dec. 18, 2017

(87) PCT Pub. No.: WO2016/204272
PCT Pub. Date: Dec. 22, 2016

(65) Prior Publication Data
US 2018/0179374 A1 Jun. 28, 2018

(30) Foreign Application Priority Data
Jun. 19, 2015 (JP) .............................. JP2015-124047

(51) Int. Cl.
*C08L 27/18* (2006.01)
*C08F 2/44* (2006.01)
*C09K 3/10* (2006.01)
*C08F 292/00* (2006.01)
*C08K 9/08* (2006.01)
*C08K 3/34* (2006.01)

(52) U.S. Cl.
CPC ................ *C08L 27/18* (2013.01); *C08F 2/44* (2013.01); *C08F 292/00* (2013.01); *C08K 9/08* (2013.01); *C09K 3/10* (2013.01); *C08K 3/34* (2013.01); *C08L 2201/08* (2013.01)

(58) Field of Classification Search
CPC .................................... C08L 27/18; C08J 5/10
See application file for complete search history.

(56) References Cited

U.S. PATENT DOCUMENTS

| | | | |
|---|---|---|---|
| 5,565,512 A | 10/1996 | Saito et al. | |
| 5,852,108 A | 12/1998 | Yamanaka et al. | |
| 6,232,386 B1 * | 5/2001 | Vargo | C08F 283/00 521/61 |
| 2010/0144948 A1 | 6/2010 | Hirano | |
| 2015/0037535 A1 | 2/2015 | Akimoto et al. | |

FOREIGN PATENT DOCUMENTS

| | | |
|---|---|---|
| CN | 1910705 A | 2/2007 |
| CN | 101724187 B | 8/2011 |
| JP | 9-111081 A | 4/1997 |
| JP | 9-324133 A | 12/1997 |
| JP | 2004-156031 A | 6/2004 |
| TW | 300242 B | 3/1997 |
| WO | 00/09603 A1 | 2/2000 |
| WO | 2005/073984 A1 | 8/2005 |
| WO | 2007/013397 A1 | 2/2007 |
| WO | 2012/124693 A1 | 9/2012 |

OTHER PUBLICATIONS

International Preliminary Report on Patentability with translation of Written Opinion dated Dec. 19, 2017 in counterpart international application No. PCT/JP2016/068103.
International Search Report for PCT/JP2016/068103 dated Jul. 19, 2016 [PCT/ISA/210].
Communication dated Dec. 13, 2018, from European Patent Office in counterpart application No. 16811746.3.

* cited by examiner

*Primary Examiner* — Monique R Peets
(74) *Attorney, Agent, or Firm* — Sughrue Mion, PLLC (57) ABSTRACT

A composition having excellent scorch resistance and storage stability, the composition containing composite particles and a fluoropolymer, and the composite particles including a polymer and inorganic particles dispersed in the polymer.

6 Claims, 1 Drawing Sheet

COMPOSITION COMPRISING FLUOROPOLYMER AND MOLDED ARTICLE

CROSS REFERENCE TO RELATED APPLICATIONS

This application is a National Stage of International Application No. PCT/JP2016/068103, filed on Jun. 17, 2016, which claims priority from Japanese Patent Application No. 2015-124047, filed on Jun. 19, 2015, the contents of all of which are incorporated herein by reference in their entirety.

TECHNICAL FIELD

The present invention relates to a composition containing a fluoropolymer, and a molded article.

BACKGROUND ART

Compositions containing fluoropolymers such as fluoroelastomers are widely used for producing molded articles such as O-rings, hoses, stem seals, shaft seals, and diaphragms because of their excellent heat resistance, chemical resistance, solvent resistance, fuel resistance, and like properties.

However, such molded articles are still severely required to have better characteristics along with progress of technology, and molded articles having better characteristics than molded articles obtainable by conventional peroxide crosslinking or polyol crosslinking are now demanded.

In such a situation, compositions crosslinked by triazine crosslinking have been proposed. For example, Patent Literature 1 discloses a fluoroelastomer composition obtained by blending an organic acid ammonium salt or an inorganic acid ammonium salt as a curing agent with a terpolymer of tetrafluoroethylene, perfluoro(lower alkyl vinyl ether) or perfluoro(lower alkoxy-lower alkyl vinyl ether), and a cyano group-containing (perfluorovinyl ether).

Patent Literature 2 discloses a curable composition containing: a perfluoroelastomer prepared from tetrafluoroethylene, a specific perfluoro vinyl ether, and a cure-site monomer; and a compound other than an organic acid or inorganic acid ammonium salt, which is decomposed at 40° C. to 330° C. to generate ammonia.

Patent Literature 3 discloses a curable composition containing a fluoroelastomer having a cyano group in the main chain and/or a side chain and inorganic nitride particles, in which the inorganic nitride particles are contained in an amount of 0.1 to 20 parts by weight relative to 100 parts by weight of the fluoroelastomer.

CITATION LIST

Patent Literature

Patent Literature 1: JP H09-111081 A
Patent Literature 2: WO 00/09603
Patent Literature 3: WO 2007/013397

SUMMARY OF INVENTION

Technical Problem

The compositions disclosed in Patent Literature documents 1 to 3, however, have room for improvement in storage stability because they sometimes cause scorch.

The present invention aims to provide, in consideration of the state of the art, a composition excellent in scorch resistance and storage stability.

Solution to Problem

Specifically, the present invention relates to a composition containing: composite particles; and a fluoropolymer, the composite particles comprising a polymer and inorganic particles dispersed in the polymer.

The fluoropolymer is preferably a fluoroelastomer.

The inorganic particles are preferably inorganic nitride particles.

The polymer preferably contains at least one monomer unit selected from the group consisting of styrene, (meth)acrylic acid esters, vinyl acetate, vinyl chloride, and acrylonitrile.

The composite particles are preferably obtained by polymerizing a monomer in a dispersion containing inorganic particles dispersed therein.

The composition is preferably a molding material.

The present invention also relates to a molded article produced using the composition.

Advantageous Effects of Invention

The composition of the present invention can provide a molded article excellent in scorch resistance and storage stability.

DESCRIPTION OF EMBODIMENTS

The present invention is specifically described in the following.

The composition of the present invention contains a fluoropolymer.

The fluoropolymer is preferably a fluoroelastomer for its excellent sealing properties, chemical resistance, and heat resistance.

The fluoroelastomer may be either a partially fluorinated elastomer or a perfluoroelastomer, and a perfluoroelastomer is preferred because it has better chemical resistance and heat resistance.

Examples of the partially fluorinated elastomer include vinylidene fluoride (VdF) fluororubber, tetrafluoroethylene (TFE)/propylene (Pr) fluororubber, tetrafluoroethylene (TFE)/propylene/vinylidene fluoride (VdF) fluororubber, ethylene/hexafluoropropylene (HFP) fluororubber, ethylene/hexafluoropropylene (HFP)/vinylidene fluoride (VdF) fluororubber, and ethylene/hexafluoropropylene (HFP)/tetrafluoroethylene (TFE) fluororubber. Preferred is at least one selected from the group consisting of vinylidene fluoride fluororubber and tetrafluoroethylene/propylene fluororubber.

The vinylidene fluoride fluororubber is preferably a copolymer containing 45 to 85 mol % of vinylidene fluoride and 55 to 15 mol % of at least one other monomer copolymerizable with the vinylidene fluoride. It is preferably a copolymer containing 50 to 80 mol % of vinylidene fluoride and 50 to 20 mol % of at least one other monomer copolymerizable with the vinylidene fluoride.

The amounts of the respective monomers constituting the fluoropolymer herein can be calculated by any appropriate combination of NMR, FT-IR, elemental analysis, and X-ray fluorescence analysis in accordance with the types of the monomers.

Examples of the at least one other monomer copolymerizable with the vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluoroisobutene, vinyl fluoride, fluoromonomers represented by the formula (6): $CH_2=CFRf^{61}$ (wherein $Rf^{61}$ is a C1-C12 linear or branched fluoroalkyl group), fluoromonomers represented by the formula (7): $CH_2=CH-(CF_2)_n-X^2$ (wherein $X^2$ is H or F; and n is an integer of 3 to 10), and monomers giving a crosslinking site; and non-fluorinated monomers such as ethylene, propylene, and alkyl vinyl ethers. These monomers may be used alone or in any combination. Preferred is at least one selected from the group consisting of TFE, HFP, fluoroalkyl vinyl ethers, and CTFE.

The fluoroalkyl vinyl ethers are each preferably at least one selected from the group consisting of:

fluoromonomers represented by the formula (8):

$$CF_2=CF-ORf^{81}$$

(wherein $Rf^{81}$ is a C1-C8 perfluoroalkyl group) fluoromonomers represented by the formula (10):

$$CF_2=CFOCF_2ORf^{101}$$

(wherein $Rf^{101}$ is a C1-C6 linear or branched perfluoroalkyl group, a C5-C6 cyclic perfluoroalkyl group, or a C2-C6 linear or branched perfluorooxyalkyl group having 1 to 3 oxygen atoms); and fluoromonomers represented by the formula (11)

$$CF_2=CFO(CF_2CF(Y^{11})O)_m(CF_2)_nF$$

(wherein $Y^{11}$ is a fluorine atom or a trifluoromethyl group; m is an integer of 1 to 4; and n is an integer of 1 to 4). The fluoroalkyl vinyl ethers are more preferably fluoromonomers represented by the formula (8).

Specific examples of the vinylidene fluoride fluororubber include VdF/HFP rubber, VdF/HFP/TFE rubber, VdF/CTFE rubber, VdF/CTFE/TFE rubber, rubber of VdF and a fluoromonomer represented by the formula (6), rubber of VdF, a fluoromonomer represented by the formula (6), and TFE, VdF/perfluoro(methyl vinyl ether) (PMVE) rubber, VdF/PMVE/TFE rubber, and VdF/PMVE/TFE/HFP rubber. The rubber of VdF and a fluoromonomer represented by the formula (6) is preferably VdF/$CH_2=CFCF_3$ rubber, and the rubber of VdF, a fluoromonomer represented by the formula (6), and TFE is preferably VdF/TFE/$CH_2=CFCF_3$ rubber.

The VdF/$CH_2=CFCF_3$ rubber is preferably a copolymer containing 40 to 99.5 mol % of VdF and 0.5 to 60 mol % of $CH_2=CFCF_3$, more preferably a copolymer containing 50 to 85 mol % of VdF and 20 to 50 mol % of $CH_2=CFCF_3$.

The tetrafluoroethylene/propylene fluororubber is preferably a copolymer containing 45 to 70 mol % of tetrafluoroethylene, 55 to 30 mol % of propylene, and 0 to 5 mol % of a fluoromonomer giving a crosslinking site.

The fluoroelastomer may be a perfluoroelastomer. The perfluoroelastomer is preferably a TFE-containing perfluoroelastomer, for example, at least one selected from the group consisting of copolymers of TFE and a fluoromonomer represented by the formula (8), (10), or (11) and copolymers of TFE, a fluoromonomer represented by the formula (8), (10), or (11), and a monomer giving a crosslinking site.

In the case of a TFE/PMVE copolymer, the composition thereof is preferably (45 to 90)/(10 to 55) (mol %), more preferably (55 to 80)/(20 to 45), still more preferably (55 to 70)/(30 to 45).

In the case of a copolymer of TFE/PMVE/a monomer giving a crosslinking site, the composition thereof is preferably (45 to 89.9)/(10 to 54.9)/(0.01 to 4) (mol %), more preferably (55 to 77.9)/(20 to 49.9)/(0.1 to 3.5), still more preferably (55 to 69.8)/(30 to 44.8)/(0.2 to 3).

In the case of a copolymer of TFE/a C4-C12 fluoromonomer represented by the formula (8), (10), or (11), the composition thereof is preferably (50 to 90)/(10 to 50) (mol %), more preferably (60 to 88)/(12 to 40), still more preferably (65 to 85)/(15 to 35).

In the case of a copolymer of TFE/a C4-C12 fluoromonomer represented by the formula (8), (10), or (11)/a monomer giving a crosslinking site, the composition thereof is preferably (50 to 89.9)/(10 to 49.9)/(0.01 to 4) (mol %), more preferably (60 to 87.9)/(12 to 39.9)/(0.1 to 3.5), still more preferably (65 to 84.8)/(15 to 34.8)/(0.2 to 3).

If the composition is outside the above range, the copolymer tends to lose the properties as rubber elastic body and to have properties similar to resin.

The perfluoroelastomer is preferably at least one selected from the group consisting of copolymers of TFE, a fluoromonomer represented by the formula (11), and a fluoromonomer giving a crosslinking site, copolymers of TFE and a perfluorovinyl ether represented by the formula (11), copolymers of TFE and a fluoromonomer represented by the formula (8), and copolymers of TFE, a fluoromonomer represented by the formula (8), and a monomer giving a crosslinking site.

The perfluoroelastomer may also be selected from perfluoroelastomers disclosed in WO 97/24381, JP S61-57324 B, JP H04-81608 B, JP H05-13961 B, and the like.

The monomer giving a crosslinking site is a monomer (cure-site monomer) having a crosslinkable group that gives a fluoropolymer a crosslinking site for forming a crosslink by a crosslinker.

The monomer giving a crosslinking site is preferably at least one selected from the group consisting of:

fluoromonomers represented by the formula (12):

$$CX^3{}_2=CX^3-R_f{}^{121}CHR^{121}X^4$$

(wherein $X^3$ is a hydrogen atom, a fluorine atom, or $C_3$; $R_f{}^{121}$ is a fluoroalkylene group, a perfluoroalkylene group, a fluoro(poly)oxyalkylene group, or a perfluoro(poly)oxyalkylene group; $R^{121}$ is a hydrogen atom or $CH_3$; and $X^4$ is an iodine atom or a bromine atom);

fluoromonomers represented by the formula (13):

$$CX^3{}_2=CX^3-R_f{}^{131}X^4$$

(wherein $X^3$ is a hydrogen atom, a fluorine atom, or $CH_3$; $R_f{}^{131}$ is a fluoroalkylene group, a perfluoroalkylene group, a fluoropolyoxyalkylene group, or a perfluoropolyoxyalkylene group; and $X^4$ is an iodine atom or a bromine atom);

fluoromonomers represented by the formula (14):

$$CF_2=CFO(CF_2CF(CF_2)O)_m(CF_2)_n-X^5$$

(wherein m is an integer of 0 to 5; n is an integer of 1 to 3; and $X^5$ is a cyano group, a carboxyl group, an alkoxycarbonyl group, an iodine atom, a bromine atom, or $-C_2I$);

fluoromonomers represented by the formula (15):

$$CH_2=CFCF_2O(CF(CF_3)CF_2O)_m(CF(CF_3))_n-X^6$$

(wherein m is an integer of 0 to 5; n is an integer of 1 to 3; and $X^6$ is a cyano group, a carboxyl group, an alkoxycarbonyl group, an iodine atom, a bromine atom, or —$CH_2OH$); and monomers represented by the formula (16):

$$CR^{162}R^{163}=CR^{164}-Z-CR^{165}=CR^{166}R^{167}$$

(wherein $R_{162}$, $R^{163}$, $R^{164}$, $R^{165}$, $R^{166}$, an $R^{167}$ may be the same as or different from each other, and are each a hydrogen atom or a C1-C5 alkyl group; and Z is a linear or branched group optionally having an oxygen atom and is a C1-C18 alkylene group, a C3-C18 cycloalkylene group, a C1-C10 at least partially fluorinated alkylene or oxyalkylene group, or a (per)fluoropolyoxyalkylene group having a molecular weight of 500 to 10000 and represented by the formula:

$$-(Q)_p-CF_2O-(CF_2CF_2O)_m(CF_2O)_n-CF_2-(Q)_p-$$

(wherein Q is an alkylene group or an oxyalkylene group; p is 0 or 1; and m/n is 0.2 to 5).

$X^3$ is preferably a fluorine atom. $Rf^{121}$ and $Rf^{131}$ are each preferably a C1-C5 perfluoroalkylene group. $R^{121}$ is preferably a hydrogen atom. $X^5$ is preferably a cyano group, an alkoxycarbonyl group, an iodine atom, a bromine atom, or —$CH_2I$. $X^6$ is preferably a cyano group, an alkoxycarbonyl group, an iodine atom, a bromine atom, or —$CH_2OH$.

The monomer giving a crosslinking site is preferably at least one selected from the group consisting of $CF_2$=$CFOCF_2CF(CF_3)OCF_2CF_2CN$, $CF_2$=$CFOCF_2CF(CF_3)OCF_2CF_2COOH$, $CF_2$=$CFOCF_2CF(CF_3)OCF_2CF_2CH_2I$, $CF_2$=$CFOCF_2CF_2CH_2I$, $CH_2$=$CFCF_2OCF(CF_3)CF_2OCF(CF_3)CN$, $CH_2$=$CFCF_2OCF(CF_3)CF_2OCF(CF_3)COOH$, $CH_2$=$CFCF_2OCF(CF_3)CF_2OCF(CF_3)CH_2OH$, $CH_2$=$CHCF_2CF_2I$, $CH_2$=$CH(CF_2)_2CH$=$CH_2$, $CH_2$=$CH(CF_2)_6CH$=$CH_2$, and $CF_2$=$CFO(CF_2)_5CN$, more preferably at least one selected from the group consisting of $CF_2$=$CFOCF_2CF(CF_3)OCF_2CF_2CN$ and $CF_2$=$CFOCF_2CF_2CH_2I$.

For excellent compression set characteristics at high temperature, the fluoroelastomer preferably has a glass transition temperature of −70° C. or higher, more preferably −60° C. or higher, still more preferably −50° C. or higher. For good cold resistance, the glass transition temperature is preferably 5° C. or lower, more preferably 0° C. or lower, still more preferably −3° C. or lower.

The glass transition temperature can be determined by heating 10 mg of a sample at 10° C./min using a differential scanning calorimeter (DSC822e, Mettler-Toledo International Inc.) to provide a DSC curve, and then determining the middle point of two intersection points of the extended base lines of the DSC curve before and after the second transition and the tangent at the point of inflection of the DSC curve. The temperature indicated by this middle point is defined as the glass transition temperature.

For good heat resistance, the fluoroelastomer preferably has a Mooney viscosity ML(1+20) at 170° C. of 30 or higher, more preferably 40 or higher, still more preferably 50 or higher. For good processability, this Mooney viscosity is preferably 150 or lower, more preferably 120 or lower, still more preferably 110 or lower.

For good heat resistance, the fluoroelastomer preferably has a Mooney viscosity ML(1+20) at 140° C. of 30 or higher, more preferably 40 or higher, still more preferably 50 or higher. For good processability, this Mooney viscosity is preferably 180 or lower, more preferably 150 or lower, still more preferably 110 or lower.

For good heat resistance, the fluoroelastomer preferably has a Mooney viscosity ML(1+10) at 100° C. of 10 or higher, more preferably 20 or higher, still more preferably 30 or higher. For good processability, this Mooney viscosity is preferably 120 or lower, more preferably 100 or lower, still more preferably 80 or lower.

The Mooney viscosity can be determined at 170° C., 140° C., or 100° C. using a Mooney viscometer MV2000E (Alpha Technologies Inc.) in conformity with JIS K6300.

The partially fluorinated elastomer and perfluoroelastomer described above can be produced by a common method. Also, an iodine compound or a bromine compound may be used as a chain transfer agent from the viewpoint that an obtainable polymer has a narrow molecular weight distribution to allow easy control of the molecular weight and that an iodine atom or a bromine atom can be introduced to an end. Examples of a polymerization method in which an iodine compound or a bromine compound is used include emulsion polymerization in an aqueous medium under pressurization in the presence of an iodine compound or a bromine compound substantially in an oxygen-free condition (iodine migration polymerization). Typical examples of the iodine compound or bromine compound to be used include a compound represented by the following formula:

$$R^{13}I_xBr_y$$

(wherein x and y each represent an integer of 0 to 2, satisfying 1≤x+y≤2; $R^{13}$ represents a C1-C16 saturated or unsaturated flourohydrocarbon group or chlorofluorohydrocarbon group, or a C1-C3 hydrocarbon group, optionally containing an oxygen atom). The use of an iodine compound or a bromine compound allows an iodine atom or a bromine atom to be introduced into the polymer to function as a crosslinking site.

Examples of the iodine compound and the bromine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bronco-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and monoiodo-monobromo substitution products of benzene, diiodo-monobromo substitution products of benzene, and (2-iodoethyl) and (2-bromoethyl) substitution products of benzene. These compounds may be used alone or in combination of two or more thereof.

In terms of polymerization reactivity, crosslinking reactivity, easy availability, and the like, 1,4-diiodoperfluorobutane, 1,6-diiodoperfluorohexane, or 2-iodoperfluoropropane is preferably used.

The fluoropolymer is preferably a fluoroelastomer having a cyano group (—CN group) in the main chain and/or a side chain. The fluoroelastomer having a cyano group (—CN group) in the main chain and/or a side chain is one in which the cyano group forms a triazine ring by cyclotrimerization to enable crosslinking of the elastomer, thereby imparting excellent compression set and heat resistance to the molded article.

Examples of the fluoroelastomer having a cyano group (—CN group) in the main chain and/or a side chain include perfluoro fluororubber and non-perfluoro fluororubber. The perfluoro fluororubber refers to one having 90 mol % or more of perfluoro monomers in its constitutional units.

Examples of the perfluoro fluororubber having a cyano group (—CN group) in the main chain and/or a side chain include one formed of tetrafluoroethylene, a perfluoro(alkyl vinyl ether), and a monomer having a cyano group (—CN group). The composition of tetrafluoroethylene/perfluoro (alkyl vinyl ether) is preferably (50 to 90)/(10 to 50) (mol %), more preferably (50 to 80)/(20 to 50) (mol %), still more preferably (55 to 75)/(25 to 45) (mol %). The amount of the monomer having a cyano group (—CN group) is preferably 0.1 to 5 mol %, more preferably 0.3 to 3 mol % relative to the total amount of tetrafluoroethylene and a perfluoro (alkyl vinyl ether) in terms of favorable crosslinking properties and heat resistance.

Examples of the perfluoro(alkyl vinyl ether) in this case include perfluoro(methyl vinyl ether) and perfluoro(propyl vinyl ether). These can be used alone or in any combination.

Examples of the monomer having a cyano group (—CN group) include monomers represented by the formulas (31) to (47) (in the formula (31) to (47), $X^1$ represents a cyano group (—CN group)):

$$CY^1{}_2=CY^1(CF_2)_n-X^1 \quad (31)$$

(wherein $Y^1$ represents a hydrogen atom or a fluorine atom, and n represents an integer of 1 to 8);

$$CF_2=CFCF_2R_f{}^2-X^1 \quad (32)$$

(wherein $R_f{}^2$ is $-(OCF_2)_n-$ or $-(OCF(CF_3))_n-$, and n represents an integer of 0 to 5);

$$(OCH_2CF_2CF_2)_nOCH_2CF_2-X^1 \quad (33)$$

(wherein m represents an integer of 0 to 5, and n represents an integer of 0 to 5);

$$(OCF(CF_3)CF_2)_nOCF(CF_3)-X^1 \quad (34)$$

(wherein m represents an integer of 0 to 5, and n represents an integer of 0 to 5);

$$CF_2=CF(OCF_2CF(CF_3))_mO(CF_2)_n-X^1 \quad (35)$$

(wherein m represents an integer of 0 to 5, and n represents an integer of 1 to 8);

$$CF_2=CF(OCF_2CF(CF_3))_m-X^1 \quad (36)$$

(wherein m represents an integer of 1 to 5);

$$CF_2=CFOCF_2(CF(CF_3)OCF_2)_nCF(-X^1)CF_3 \quad (37)$$

(wherein n represents an integer of 1 to 4);

$$CF_2=CFO(CF_2)_nOCF(CF_3)-X^1 \quad (38)$$

(wherein n represents an integer of 2 to 5);

$$CF_2=CFO(CF_2)_n-(C_6H_4)-X^1 \quad (39)$$

(wherein n represents an integer of 1 to 6);

$$CF_2=CF(OCF_2CF(CF_3))_nOCF_2CF(CF_3)-X^1 \quad (40)$$

(wherein n represents an integer of 1 to 2);

$$CH_2=CFCF_2O(CF(CF_3)CF_2O)_nCF(CF_3)-X^1 \quad (41)$$

(wherein n represents an integer of 0 to 5);

$$CF_2=CFO(CF_2CF(CF_3)O)_m(CF_2)_n-X^1 \quad (42)$$

(wherein m represents an integer of 0 to 5, and n represents an integer of 1 to 3);

$$CH_2=CFCF_2OCF(CF_3)OCF(CF_3)-X^1 \quad (43),$$

$$CH_2=CFCF_2OCH_2CF_2-X^1 \quad (44),$$

$$CF_2=CFO(CF_2CF(CF_3)O)_mCF_2CF(CF_3)-X^1 \quad (45)$$

(wherein m represents an integer of 0 or more);

$$CF_2=CFOCF(CF_3)CF_2O(CF_2)_n-X^1 \quad (46)$$

(wherein n represents an integer of 1 or more); and $$CF_2=CFOCF_2OCF_2CF(CF_3)OCF_2-X^1 \quad (47).$$

These monomers may be used alone or in any combination.

Among the above monomers, preferred is a monomer represented by the formula (35) or (42), and more preferred is $CF_2=CFOCF_2CF(CF_3)OCF_2CF_2CN$.

Since the monomers represented by the formulas (31) to (47) have a cyano group, the cyano group is cyclotrimerized to allow progress of triazine crosslinking. These perfluoro fluororubbers can be prepared by a common method.

Specific examples of the perfluoro fluororubbers include fluororubbers disclosed in WO 97/24381, JP S61-57324 B, JP H04-81608 B, and JP H05-13961 B.

Examples of the non-perfluoro fluororubber having a cyano group (—CN group) in the main chain and/or a side chain include vinylidene fluoride (VdF) fluororubber, tetrafluoroethylene (TFE)/propylene fluororubber, tetrafluoroethylene (TFE)/propylene/vinylidene fluoride (VdF) fluororubber, ethylene/hexafluoroethylene (HFP) fluororubber, ethylene/hexafluoropropylene (HFP)/vinylidene fluoride (VdF) fluororubber, ethylene/hexafluoropropylene (HFP)/ tetrafluoroethylene (TFE) fluororubber, fluorosilicone fluororubber, and fluorophosphazene fluororubber. These may be used alone or in any combination within a range that does not impair the effects of the present invention.

The vinylidene fluoride fluororubber refers to a fluorine-containing copolymer formed of 45 to 85 mol % of vinylidene fluoride and 55 to 15 mol % of at least one other monomer copolymerizable with the vinylidene fluoride, Preferably, the vinylidene fluoride fluororubber refers to a fluorine-containing copolymer formed of 50 to 80 mol % of vinylidene fluoride and 50 to 20 mol % of at least one other monomer copolymerizable with the vinylidene fluoride.

Examples of the at least one other monomer copolymerizable with vinylidene fluoride include: fluorine-containing monomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro (alkyl vinyl ethers)(PAVE), and vinyl fluoride; and fluorine-free monomers such as ethylene, propylene, and alkyl vinyl ethers. These may be used alone or in any combination. Among these, preferred are tetrafluoroethylene, hexafluoropropylene, and perfluoro(alkyl vinyl ethers).

Specific examples of the rubber include VdF-HFP rubber, VdF-HFP-TFE rubber, VdF-CTFE rubber, and VdF-CTFE-TFE rubber.

The tetrafluoroethylene/propylene fluororubber refers to a fluorine-containing copolymer formed of 45 to 70 mol % of tetrafluoroethylene and 55 to 30 mol % of propylene and further containing 0 to 5 mol % of a monomer giving a crosslinking site based on the total amount of tetrafluoroethylene and propylene.

Examples of the monomer giving a crosslinking site include cyano group-containing monomers disclosed in JP H04-505345 T and JP H05-500070 T and the monomers represented by the above formulas (31) to (47).

These non-perfluoro fluororubbers can be prepared by a common method.

The fluoroelastomer used may also be a thermoplastic fluororubber formed of an elastomeric fluoropolymer chain segment and a non-elastomeric fluoropolymer chain segment, or a rubber composition formed of the fluororubber and thermoplastic fluororubber.

The method for separating a polymerization product from a polymerization reaction mixture is preferably a coagulation method by acid treatment in terms of simplification of the process. Alternatively, a polymerization product may be separated from a polymerization mixture by acid treatment, followed by freeze-drying or the like. Moreover, a method of coagulation by ultrasonic wave or coagulation by a mechanical force may also be employed.

Further, in order to introduce a cyano group, the method disclosed in WO 00/05959 may also be employed.

The composition of the present invention further contains composite particles formed of inorganic particles and a polymer. In the composite particles, inorganic particles are dispersed in the polymer. Since the surfaces of the inorganic particles are covered with the polymer, generation of a component that contributes to crosslinking from the inorganic particles can be reduced. Accordingly, the composition of the present invention is excellent in scorch resistance and storage stability.

The composition of the present invention preferably contains 0.1 to 30 parts by mass of the composite particles relative to 100 parts by mass of the fluoropolymer. The amount of the composite particles is more preferably 0.3 parts by mass or more, still more preferably 0.5 parts by mass or more, and more preferably 10 parts by mass or less, still more preferably 5 parts by mass or less. If the amount of the composite particles is too large, the progress of the crosslinking reaction may not be controlled. If the amount of the composite particles is too small, the crosslinking reaction may not sufficiently progress.

The inorganic particles are preferably inorganic nitride particles. Since inorganic nitride particles generate ammonia ($NH_3$), the cyano group in the fluoroelastomer is cyclotrimerized to progress the triazine crosslinking reaction.

The inorganic particles are not particularly limited, and examples thereof include particles of silicon nitride ($Si_3N_4$), lithium nitride, titanium nitride, aluminum nitride, boron nitride, vanadium nitride, and zirconium nitride. Preferred among these are silicon nitride particles because nanosized fine particles can be provided and silicon nitride does not contain metals or the like which are undesirable in the step of producing semiconductors. Two or more kinds of these nitride particles may be used in admixture.

The inorganic particles have a particle size of preferably 1000 nm or smaller, more preferably 300 nm or smaller, still more preferably 100 nm or smaller. Though not particularly limited, the lower limit thereof is preferably 5 nm.

The polymer constituting the composite particles is only required to contain a monomer unit that has a vinyl group and is radically polymerizable. The polymer is preferably a polymer containing at least one monomer unit selected from the group consisting of styrene, (meth)acrylic acid esters, vinyl acetate, vinyl chloride, and acrylonitrile, more preferably a polymer containing at least one monomer unit selected from the group consisting of styrene, (meth)acrylic acid esters, and vinyl acetate. The term "(meth)acrylic acid ester" as used herein refers to an acrylic acid ester or a methacrylic acid ester.

The (meth)acrylic acid ester is preferably at least one selected from the group consisting of methyl methacrylate, ethyl methacrylate, butyl methacrylate, and butyl acrylate.

The polymer constituting the composite particles is preferably at least one selected from the group consisting of polystyrene, copolymers of styrene, polymethacrylic acid esters, copolymers of methacrylic acid esters, polyvinyl acetate, polyvinyl chloride, and polyacrylonitrile, more preferably at least one selected from the group consisting of polystyrene, polymethacrylic acid esters, and polyvinyl acetate.

The polymer has a number average molecular weight (e.g., weight average molecular weight) of 10000 to 1000000. The molecular weight can be measured by a method using liquid chromatography or a precipitation method.

The composite particles contain the inorganic particles in an amount of preferably 1 to 70% by mass. The amount of the inorganic particles is more preferably 10% by mass or more, still more preferably 20% by mass or more, and more preferably 60% by mass or less, still more preferably 50% by mass or less. If the amount of the inorganic particles is too large, the progress of the crosslinking reaction may not be controlled. If the amount of the inorganic particles is too small, the crosslinking reaction may not progress sufficiently.

The composite particles have a particle size of preferably 0.01 to 100 μm. The particle size is more preferably 0.05 μm or more, still more preferably 0.1 μm or more, and more preferably 30 μm or less, sill more preferably 10 μm or less. If the particle size of the composite particles is too small, the handleability thereof may be lowered. If the particle size of the composite particles is too large, they may be difficult to disperse well in the composition.

The composite particles are preferably obtained by polymerizing a monomer in a dispersion in which inorganic particles are dispersed.

The composite particles can be prepared by a known method (the method described an "Know-how in preparation of nano/micro-capsules" by Masato Tanaka, published by Technosystem Co., Ltd. on 6 May 2008).

The composite particles can be prepared specifically by a production method including: a step of dispersing inorganic particles, a monomer, a dispersant, and a polymerization initiator in a solvent to prepare a dispersion; a step of polymerizing the monomer in the dispersion to prepare a slurry; and a step of recovering composite particles from the slurry.

The monomer is only required to be a monomer that has a vinyl group and is radically polymerizable. The monomer is preferably at least one monomer selected from the group consisting of styrene, (meth)acrylic acid esters, vinyl acetate, vinyl chloride, and acrylonitrile, more preferably at least one monomer selected from the group consisting of styrene, (meth; acrylic acid esters, and vinyl acetate.

The mass ratio of the inorganic particles and the monomer (inorganic particles/monomer) is preferably 1/99 to 50/50, more preferably 3/97 or more, and preferably 40/60 or less.

The dispersant is preferably at least one selected from the group consisting of polyvinyl pyrrolidone, saponification products of polyvinyl alcohol, and hydroxypropyl cellulose, more preferably polyvinyl pyrrolidone.

The polymerization initiator is preferably at least one selected from the group consisting of azo compounds and peroxides, more preferably an azo compound. Examples of the azo compound include 2,2'-azobis-2,4-dimethylvaleronitrile and 2,2'-azobisisobutyronitrile.

The solvent is preferably at least one selected from the group consisting of water, alcohol, benzene, and toluene, more preferably at least one selected from the group consisting of water and alcohol. The alcohol is preferably a C1-C5 alcohol, more preferably methanol or ethanol.

For dispersion of each component in a solvent, a known means such as ultrasonic waves may be used.

Polymerization of the monomer can be initiated by heating of the dispersion to a temperature not lower than the decomposition temperature of the polymerization initiator. The decomposition temperature is normally 30° C. to 120° C. The polymerization time is normally 1 to 24 hours.

When the polymerization is completed, a slurry containing the composite particles and the solvent is provided. A method for recovering the composite particles from the slurry is known. After the recovery, the composite particles may be dried, if desired.

Though a crosslinker is not an essential component, the composition of the present invention may contain a crosslinker. Examples of the crosslinker include crosslinkers used for peroxide crosslinking, polyol crosslinking, polyamine crosslinking, triazine crosslinking, oxazole crosslinking, imidazole crosslinking, thiazole crosslinking, and the like. In the case where the fluoropolymer is a fluoroelastomer having a cyano group (—CN group) in the main chain and/or a side chain, the crosslinker is preferably at least one selected from the group consisting of oxazole crosslinkers, imidazole crosslinkers, and thiazole crosslinkers.

The crosslinker used in peroxide crosslinking may be any organic peroxide that can easily generate peroxy radicals in the presence of heat or a redox system. Specific examples thereof include 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropyl benzene, 2,5-dimethyl-2,5-di(t-butylperoxy)hexane, 2,5-dimethyl-2,5-di(t-butylperoxy)-hexyne-3, benzoyl peroxide, t-butyl peroxy benzene, 2,5-dimethyl-2,5-di(benzoylperoxy)hexane, t-butyl peroxy maleic acid, and t-butyl peroxy isopropyl carbonate. The type and amount of the organic peroxide is usually selected in consideration of factors such as the amount of active —O—O— and the decomposition temperature.

A cross-linking aid to be used in this case may be a compound having reaction activity with peroxy radicals and polymer radicals, and examples thereof include polyfunctional compounds having functional groups such as $CH_2=CH-$, $CH_2=CHCH_2-$, and $CF_2=CF-$. Specific examples thereof include triallyl cyanurate, triallyl isocyanurate (TAIC), triacrylformal, triallyl trimellitate, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris (2,3,3-trifluoro-2-propenyl)-1,3,5-triazine 2,4,6-trione), tris(diallylamine)-S-triazine, triallyl phosphite, N,N-diallyl acrylamide, and 1,6-divinyl dodecafluorohexane.

Examples of the crosslinker used in polyol crosslinking include polyhydric alcohol compounds such as bisphenol A and bisphenol AF.

Examples of the crosslinker used in polyamine crosslinking include polyvalent amine compounds such as hexamethylene diamine carbamate, N,N'-dicinnamylidene-1,6-hexane diamine, and 4,4'-bis(aminocyclohexyl)methane carbamate.

Examples of the crosslinker used in triazine crosslinking include organotin compounds such as tetraphenyltin and triphenyltin.

Examples of the crosslinkers used for oxazole crosslinking, imidazole crosslinking, and thiazole crosslinking systems include:

bisdiaminophenyl crosslinkers, bisaminophenol crosslinkers, and bisaminothiophenol crosslinkers represented by the formula (20):

(20)

(wherein $R^4$ is $-SO_2-$, $-O-$, $-CO-$, a C1-C6 alkylene group, a C1-C10 perfluoroalkylene group, a single bond, or a group represented by the following formula:

one of $R^5$ and $R^6$ is $-NH_2$ and the other is $-NHR^7$, $-NH_2$, $-OH$, or $-SN$; $R^7$ is a hydrogen atom, a fluorine atom, or a monovalent organic group; preferably, $R^5$ is $-NH_2$ and $R^6$ is $-NHR^7$; preferred specific examples of the C1-C6 alkylene group include a methylene group, an ethylene group, a propylene group, a butylene group, a pentylene group, and a hexylene group; examples of the C1-C10 perfluoroalkylene group include a group represented by the following formula:

these compounds are known as examples of bisdiaminophenyl compounds in, for example, JP H02-59177 B and JP H08-120146 A);

bisamidrazone crosslinkers represented by the formula (21):

(21)

(wherein $R^4$ is defined in the same manner as mentioned above; and $R^8$ is

)

and bisamidoxime crosslinkers represented by the formula (22):

(22)

(wherein $R_f^3$ is a C1-10 perfluoroalkylene group) or the formula (23):

(23)

(wherein a is an integer of 1 to 10). These bisaminophenol crosslinkers, bisaminothiophenol crosslinkers, or bisdiaminophenyl crosslinkers are conventionally used for cross-linking systems where a cyano group serves as a crosslinking point. Further, these crosslinkers also react with a carboxyl group and an alkoxycarbonyl group to form an oxazole ring, thiazole ring, or imidazole ring, providing a crosslinked article.

Particularly preferred examples of the crosslinker include compounds having multiple 3-amino-4-hydroxyphenyl or 3-amino-4-mercapto phenyl groups and compounds represented by the formula (24):

(24)

(wherein $R^4$, $R^5$, and $R^6$ are defined in the same manner as mentioned above). Specific examples thereof include 2,2-bis(3-amino-4-hydroxyphenyl)hexafluoropropane (general name: bis(aminophenol) AF), 2,2-bis(3-amino-4-mercaptophenyl)hexafluoropropane, tetraaminobenzene, bis-3,4-diaminophenylmethane, bis-3,4-diaminophenyl ether, 2,2-bis(3,4-diaminophenyl)hexafluoropropane, 2,2-bis[3-amino-4-(N-phenylamino)phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl]hexafluoropropane, and 2,2-bis[3-amino-4-(N-benzylamino)phenyl]hexafluoropropane.

In view of the heat resistance, steam resistance, amine resistance, and good crosslinkability, the crosslinker is preferably 2,2-bis[3-amino-4-(N-phenylamino)phenyl]hexafluoropropane.

The crosslinker is used in an amount of preferably 0.05 to 10 parts by mass, more preferably 0.5 to 5 parts by mass, relative to 100 parts by mass of the fluoropolymer. Less than 0.05 parts by mass of the crosslinker tends to cause insufficient crosslinking of the fluoropolymer, while more than 10 parts by mass thereof tends to impair the physical properties of a crosslinked article.

The composition may further contain common filler.

Examples of the common filler include engineering plastic-derived organic fillers (excluding the compound (a)) such as imide fillers having an imide structure (e.g., polyimide, polyamide imide, and polyether imide), polyarylate, polysulfone, polyethersulfone, polyphenylenesulfide, polyether ether ketone, polyether ketone, and polyoxybenzoate; and inorganic fillers such as metal oxide fillers (e.g., aluminum oxide, silicon oxide, and yttrium oxide), metal carbide (e.g., silicon carbide and aluminum carbide), metal nitride fillers (e.g., silicon nitride and aluminum nitride), aluminum fluoride, carbon fluoride, and carbon black.

For the effect of blocking a variety of plasma, preferred among these are aluminum oxide, yttrium oxide, silicon oxide, polyimide, and carbon fluoride.

These inorganic fillers and organic fillers may be used alone or in combination of two or more.

The common filler is blended in an amount of preferably 0.5 to 100 parts by mass, more preferably 5 to 50 parts by mass, relative to 100 parts by mass of the fluoropolymer.

In the field not requiring high purity or non-staining, any usual additives such as filler, processing aids, plasticizers, and colorants may be added to the fluoropolymer composition, if necessary. Further, one or more common crosslinkers or cross-linking aids other than those mentioned above may be added.

A particularly preferred embodiment of the composition of the present invention is mentioned below. Specifically, the composition contains composite particles and a fluoroelastomer having a cyano group (—CN group) in the main chain and/or a side chain, and the composite particles are formed of a polymer and inorganic nitride particles dispersed in the polymer. The amount of the composite particles is 0.1 to 30 parts by mass relative to 100 parts by mass of the fluoroelastomer. The fluoroelastomer is preferably perfluoro fluororubber. The inorganic nitride particles are preferably silicon nitride particles.

The composition can be suitably used as a molding material to be crosslink-molded into a molded article.

The composition can be produced by a production method including a step of dispersing the inorganic particles, the monomer, the dispersant, and the polymerization initiator in the solvent to prepare a dispersion; a step of polymerizing the monomer in the dispersion to prepare a slurry; a step of recovering composite particles from the slurry; and a step of kneading the composite particles and a fluoropolymer.

The kneading can be carried out using a conventional polymer processing machine such as an open roll mill, a Banbury mixer, a kneader, or a closed-type mixer.

A method of processing the composition as a molding material into a preform may be a usual method, and examples of such a method include known methods such as a method of heat-compressing the composition in a mold, a method of injecting the composition into a heated mold, and a method of extruding the composition using an extruder. In the case of extruded products such as hoses and electric wires, such molded articles can be produced by heat-crosslinking the extrudate with steam, for example.

A method of processing the composition into a preform may be a usual method, and examples of such a method include a method of heat-compressing the composition in a mold, a method of injecting the composition into a heated mold, and a method of extruding the composition using an extruder. After the extrusion, the extrudate is subjected to primary vulcanization and then secondary vulcanization to give a molded article.

The conditions for the primary vulcanization are preferably 150° C. to 200° C. for 5 to 120 minutes, more preferably 170° C. to 190° C. for 5 to 60 minutes. The vulcanization means employed may be a known vulcanization means, such as press crosslinking.

The conditions for the secondary vulcanization are preferably 250° C. to 320° C. for 2 to 24 hours, more preferably 280° C. to 310° C. for 5 to 20 hours. The vulcanization means employed may be a known vulcanization means, such as oven crosslinking.

The present invention also relates to a molded article produced using the composition.

The molded article of the present invention can be suitably used as a sealant for semiconductor manufacturing devices requiring especially high-level cleanliness, particularly semiconductor manufacturing devices where high-density plasma irradiation is performed. Examples of the sealant include O-rings, square-rings, gaskets, packings, oil seals, bearing seals, and lip seals.

The molded article may also be used as various polymer products, such as diaphragms, tubes, hoses, rubber rolls, and belts, used in semiconductor manufacturing devices. The molded article may also be used as a coating material or a lining material.

The "semiconductor manufacturing devices" used herein are not limited to devices for manufacturing semiconductors, but widely include the whole series of devices used in the field of semiconductors requiring high-level cleanliness, such as devices for manufacturing liquid crystal panels or plasma panels. Examples thereof include the following.
(1) Etching devices
 Dry etching devices
 Plasma etching devices
 Reactive ion etching devices
 Reactive ion beam etching devices
 Sputter etching devices
 Ion beam etching devices
 Wet etching devices
 Ashing devices
(2) Cleaning devices
 Dry etching cleaning devices
 UV/$O_3$ cleaning devices
 Ion beam cleaning devices
 Laser beam cleaning devices
 Plasma cleaning devices
 Gas etching cleaning devices
 Extraction cleaning devices
 Soxhlet's extraction cleaning devices
 High-temperature high-pressure extraction cleaning devices
 Microwave extraction cleaning devices
 Supercritical extraction cleaning devices
(3) Exposure devices
 Steppers
 Coaters and developers
(4) Polishing devices
 CMP devices
(5) Film-forming devices
 CVD devices
 Sputtering devices
(6) Diffusion and ion implantation devices
 Oxidation diffusion devices
 Ion implantation devices The molded article of the present invention exerts excellent performance as a sealant for CVD devices, plasma etching devices, reactive ion etching devices, ashing devices, or excimer laser exposure devices, for example.

EXAMPLES

The present invention is described with reference to, but not limited to, examples.

The numerical values in the examples were measured by the following methods.

The average particle size of the composite particles was measured using a laser diffraction particle size analyzer, SALD-7000 available from Shimadzu Corporation.

Preparation Example 1

A 500-ml separable flask was used as a reaction vessel. An amount of 2.2 g of polyvinyl pyrrolidone and 30 mL of a styrene monomer were dissolved in 270 ml of ethanol in the reaction vessel. To the resulting solution was further added 1.0 g of silicon nitride (trade name: SN-A00, average particle size: 30 nm, available from Ube Industries, Ltd.), followed by ultrasonic dispersion.

The dispersion obtained by the ultrasonic dispersion was stirred with a magnetic stirrer for 90 minutes, and 3.0 g of 2,2'-azobis-2,4-dimethylvaleronitrile as a polymerization initiator was dissolved therein, followed by dispersion polymerization at 70° C. for eight hours.

Composite particles were separated from the obtained slurry using a centrifuge, and then dried an vacuum for 24 hours. Then, the resulting particles were heated in an inert gas at 100° C. for one hour. The obtained composite particles had a structure containing silicon nitride particles dispersed in polystyrene and had an average particle size of 8.1 µm.

Evaluation of Ammonia Generation Behavior

Figure 1:
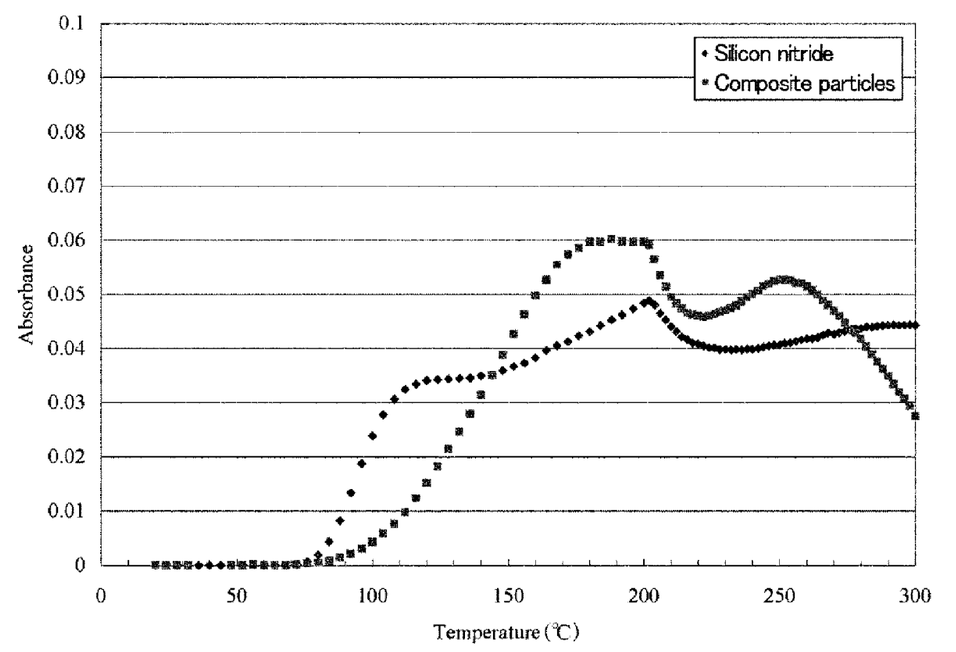
FIG. 1 is a graph showing the ammonia generation behavior of composite particles.

A sample was set in a reactor and heated at a temperature-increasing rate of 4° C./min within a range of 20° C. to 200° C. and 2° C./rain within a range of 200° C. to 300° C., while gas adjusted to have an oxygen concentration of 20% by volume and a moisture content of 1% by volume was flown at 10 cc/min. The heating caused reaction between silicon nitride and moisture. The amount of ammonia generated by the reaction was measured using a Fourier transform infrared spectrophotometer (FT-IR). The amount of generated ammonia was evaluated by the absorbance at a wavenumber of 966 $cm^{-1}$. FIG. 1 shows the ammonia generation behavior per 10 mg of silicon nitride relative to the heating temperature.

As shown in FIG. 1, generation of ammonia from the composite particles is suppressed at a temperature lower than 150° C. and a large amount of ammonia is generated at a temperature of 150° C. or higher. In contrast, a large amount of ammonia is generated from silicon nitride (trade name: N-A00, average particle size: 30 nm, available from Ube Industries, Ltd.) even at a temperature lower than 150° C.

Example 1

To 100 parts by mass of a fluoroelastomer (TFE/PMVE/cyano group-containing monomer=59.4/40.1/0.5 (molar ratio), available from Daikin Industries, Ltd.) were added 1.0 part by mass of the composite particles, and the mixture was kneaded with an open roll mill to provide a crosslinkable fluororubber composition.

The fluororubber composition was vacuum-packed in an alumina bag, and stored at 23° C. The storage stability was evaluated based on a variation in ML obtained by analysis of vulcanization characteristics at 180° C. for 30 minutes using a moving die rheometer MDR2000 available from Alpha Technologies.

ML refers to a minimum torque value and is an index of the flowability during vulcanization molding. A smaller ML indicates better flowability, and ML tends to increase along with the progress of scorch due to generation of ammonia.

Table 1 shows the results.

The obtained fluororubber composition was pressed at 180° C. for 30 minutes to be crosslinked, and then further crosslinked in an oven at 200° C. for 12 hours, at 250° C. for 3 hours, and at 290° C. for 3 hours, thereby producing a test sample of a crosslinked article with a thickness of 2 mm.

Ordinary Physical Properties

The 100% modulus (MPa), tensile strength (MPa), elongation (%), and hardness PEAK (SHORE A) of a vulcanizate with a thickness of 2 mm in an ordinary state (2.5° C.) were measured in conformity with JIS K6251. The hardness after three seconds was also measured in conformity with JIS K6253. Table 2 shows the results.

Example 2

A fluororubber composition was prepared in the same manner as in Example 1, except that 0.8 parts by mass of 4,4'-[2,2,2-trifluoro-1-(trifluoromethyl)ethylidene]bis[N1-phenyl-1,2-benzene diamine] was added as a crosslinker to the fluororubber composition of Example 1. A test sample of a crosslinked article with a thickness of 2 mm was produced using the obtained fluororubber composition in the same manner as in Example 1. The obtained fluororubber composition and test sample were evaluated in the same manner as in Example 1. Tables 1 and 2 show the results.

Comparative Example 1

A fluororubber composition was prepared in the same manner as in Example 1, except that the composite particles were not used and 0.25 parts by mass of silicon nitride (trade name: SN-A00, average particle size: 30 nm, available from Ube industries, Ltd.) was added to 100 parts by mass of a fluoroelastomer (TFE/PMVE/cyano group-containing monomer=59.4/40.1/0.5 (molar ratio), available from Daikin industries, Ltd.). A test sample of a crosslinked article with a thickness of 2 mm was produced using the obtained fluororubber composition in the same manner as in Example 1. The obtained fluororubber composition and test sample were evaluated in the same manner as in Example 1. Tables 1 and 2 show the results.

Comparative Example 2

A fluororubber composition was prepared in the same manner as in Example 1, except that the composite particles were not used and 0.25 parts by mass of silicon nitride (trade name: SN-A00, average particle size: 30 nm, available from Ube industries, Ltd.) and 0.8 parts by mass of 4,4'-[2,2,2-trifluoro-1-(trifluoromethyl)ethylidene]bis[N1-phenyl-2,2-benzenediamine] as a crosslinker were added to 100 parts by mass of a fluoroelastomer (TFE/PMVE/cyano group-containing monomer=59.4/40.1/0.5 (molar ratio), available from Daikin Industries, Ltd.). A test sample of a crosslinked article with a thickness of 2 mm was produced using the obtained fluororubber composition in the same manner as in Example 1. The obtained fluororubber composition and test sample were evaluated in the same manner as in Example 1. Tables 1 and 2 show the results.

Table 1 shows that in Examples 1 and 2 in which the composite particles were added, ML immediately after kneading was smaller and the ML change rate after storage was also smaller than Comparative Examples 1 and 2 in which the composite particles were not added. Namely, ammonia generation was suppressed and the scorch stability was improved. Table 2 shows that rubber vulcanizate properties were hardly different between Examples 1 and 2 and Comparative Examples 1 and 2, which means that addition of the composite particles did not adversely affect the physical properties.

TABLE 1

|  | Days elapsed (days) | ML (dNm) | ML change rate (%) |
| --- | --- | --- | --- |
| Example 1 | 0 | 2.58 | — |
|  | 1 | 2.48 | 4 |
|  | 6 | 2.52 | 2 |
|  | 11 | 2.69 | 4 |
| Example 2 | 0 | 2.22 | — |
|  | 1 | 2.28 | 3 |
|  | 6 | 2.29 | 3 |
|  | 11 | 2.46 | 11 |
| Comparative Example 1 | 0 | 3.39 | — |
|  | 1 | 3.61 | 6 |
|  | 6 | 4.10 | 21 |
|  | 11 | 4.18 | 23 |
| Comparative Example 2 | 0 | 3.02 | — |
|  | 1 | 3.14 | 4 |
|  | 6 | 3.42 | 13 |
|  | 11 | 3.96 | 31 |

TABLE 2

|  | Example 1 | Example 2 | Comparative Example 1 | Comparative Example 2 |
| --- | --- | --- | --- | --- |
| Tensile strength (MPa) | 14.5 | 14.4 | 13.5 | 10.4 |
| 100% modulus (MPa) | 1.2 | 1.4 | 1.2 | 1.3 |
| Elongation (%) | 320 | 290 | 300 | 270 |
| Hardness PEAK (SHORE A) | 58 | 60 | 58 | 60 |
| Hardness after three seconds (SHORE A) | 52 | 53 | 53 | 53 |

Preparation Example 2

An amount of 256 g of polyvinyl pyrrolidone and 800 mL of methyl methacrylate were dissolved in 8100 ml of anhydrous ethanol in a 15-L reactor, and 300 g of silicon nitride (trade name: SN-A00, average particle size: 30 nm, available from Ube Industries, Ltd.), 89 g of 2,2'-azobis-2,4-dimethylvaleronitrile, and 33 g of 2,2' azobisisobutyronitrile were further added. They were mixed using a six-blade inclined paddle. The solution obtained by the mixing was warmed to 80° C., followed by dispersion polymerization for 15 hours.

After the dispersion polymerization, composite particles were separated using a centrifugal settler and then dried using a dryer set at 40° C. The obtained composite particles had a structure containing silicon nitride particles dispersed in polymethyl methacrylate and had an average particle size of 12.0 μm.

Example 3

To 100 parts by mass of a fluoroelastomer (TFE/PMVE/cyano group-containing monomer=59.4/40.1/0.5 (molar ratio), available from Daikin Industries, Ltd.) was added 0.5 parts by mass of the composite particles obtained in Preparation Example 2, followed by addition of 23 parts by mass of carbon (Thermax N990 available from Cancarb) as a filler. The mixture was kneaded with an open roll mill to provide a crosslinkable fluororubber composition. A test sample of a crosslinked article with a thickness of 2 mm was produced using the obtained fluororubber composition in the same manner as in Example 1. The obtained fluororubber composition and test sample were evaluated in the same manner as in Example 1. Tables 3 and 4 show the results.

Comparative Example 3

A fluororubber composition was prepared in the same manner as in Example 3, except that the composite particles were not used and 0.25 parts by mass of silicon nitride (trade name: SN-A00, average particle size: 30 nm, available from. Ube Industries, Ltd.) was added to 100 parts by mass of a fluoroelastomer (TFE/PMVE/cyano group-containing monomer=59.4/40.1/0.5 (molar ratio), available from Daikin Industries, Ltd.). A test sample of a crosslinked article with a thickness of 2 mm was produced using the obtained fluororubber composition in the same manner as in Example 1. The obtained fluororubber composition and test sample were evaluated in the same manner as in Example 1. Tables 3 and 4 show the results.

Table 3 shows that in Example 3 in which the composite particles were added, ML immediately after kneading was smaller and the ML change rate after storage was also smaller than Comparative Example 3 in which composite particles were not added. Namely, ammonia generation was suppressed and the scorch stability was improved. Table 4 shows that rubber vulcanizate properties were hardly different between Example 3 and Comparative Example 3, which means that addition of the composite particles did not adversely affect the physical properties.

TABLE 3

|  | Days elapsed (days) | ML (dNm) | ML change rate (%) |
|---|---|---|---|
| Example 3 | 0 | 4.26 | — |
|  | 6 | 4.41 | 4 |
|  | 15 | 4.68 | 10 |
| Comparative Example 3 | 0 | 5.06 | — |
|  | 6 | 6.28 | 24 |
|  | 15 | 7.48 | 48 |

TABLE 4

|  | Example 3 | Comparative Example 3 |
|---|---|---|
| Tensile strength (Mpa) | 18.9 | 19.9 |
| 100% modulus (Mpa) | 7.0 | 7.4 |
| Elongation (%) | 185 | 180 |
| Hardness PEAK (SHORE A) | 74 | 74 |
| Hardness after three seconds (SHORE A) | 67 | 68 |

The invention claimed is:

1. A composition comprising:

composite particles; and a fluoropolymer, the composition containing 0.1 to 30 parts by mass of the composite particles relative to 100 parts by mass of the fluoropolymer, the composite particles comprising a polymer and inorganic particles dispersed in the polymer, and wherein the fluoropolymer is a fluoroelastomer.

2. The composition according to claim 1, wherein the inorganic particles are inorganic nitride particles.

3. The composition according to claim 1, wherein the polymer contains at least one monomer unit selected from the group consisting of styrene, (meth) acrylic acid esters, vinyl acetate, vinyl chloride, and acrylonitrile.

4. The composition according to claim 1, wherein the composite particles are obtained by polymerizing a monomer in a dispersion containing inorganic particles dispersed therein.

5. The composition according to claim 1, which is a molding material.

6. A molded article produced using the composition according to claim 1.

* * * * *